United States Patent [19]
Mott

[11] Patent Number: 5,039,345
[45] Date of Patent: Aug. 13, 1991

[54] FIBER COMPOSITE ARTICLE AND METHOD OF MANUFACTURE

[75] Inventor: John R. Mott, Walkersville, Md.

[73] Assignee: Advanced Metals Technology Corp., Frederick, Md.

[21] Appl. No.: 485,580

[22] Filed: Feb. 27, 1990

Related U.S. Application Data

[62] Division of Ser. No. 179,745, Apr. 5, 1988, Pat. No. 4,921,222.

[51] Int. Cl.$^5$ .............................................. C21B 7/04
[52] U.S. Cl. ........................ 106/711; 106/644; 106/676; 266/275; 266/285; 266/286; 501/95
[58] Field of Search ............... 266/275, 285, 286; 264/30; 373/155; 501/95, 32; 106/644, 676, 711

[56] References Cited

U.S. PATENT DOCUMENTS

| | | | |
|---|---|---|---|
| 3,503,598 | 3/1970 | Babel et al. | 266/39 |
| 3,689,051 | 9/1972 | Miller . | |
| 3,703,601 | 11/1972 | Babel | 13/27 |
| 3,916,047 | 10/1975 | Niesen | 428/35 |
| 4,492,382 | 1/1985 | Hounsel | 277/12 |
| 4,618,964 | 10/1986 | Larsson et al. | 373/155 |
| 4,675,879 | 6/1987 | Meredith | 373/155 |

FOREIGN PATENT DOCUMENTS

| | | |
|---|---|---|
| 0077940 | 5/1983 | European Pat. Off. . |
| 0152849 | 2/1985 | European Pat. Off. . |
| 2809072 | 9/1978 | Fed. Rep. of Germany . |
| 2106888 | 4/1983 | United Kingdom . |
| 2190371 | 11/1987 | United Kingdom . |

*Primary Examiner*—Mark L. Bell
*Assistant Examiner*—Alan Wright
*Attorney, Agent, or Firm*—Berman, Aisenberg & Platt

[57] ABSTRACT

An article and method for its manufacture are described. The article is preferably a ladle used in the manufacture of metals and receives molten metal for further chemical processing in the ladle or for transportation. The ladle is transparent to a wide range of electromagnetic radiation wavelengths which allows the metal to be heated or stirred by induction without heating the ladle itself. The ladle is made of glass fibers and an inorganic cement, and this provides strength along with high temperature resistance. The article is manufactured by winding glass fiber around a mandrel, the glass fiber having an inorganic cement adhered to it. In one technique, the cement is provided on the fiber as an aqueous slurry, and the product is allowed to air cure after winding. In a second technique, the cement is adhered to the fiber by electrostatic attraction. After winding is complete, additional cement may be added, the product is placed in an autoclave supplied with steam whereby the cement takes up water, and it is then allowed to cure. After the product is cured, it is preferably sawed into two pieces to form two inductively transparent ladles.

15 Claims, 1 Drawing Sheet

FIBER COMPOSITE ARTICLE AND METHOD OF MANUFACTURE

This is a division of U.S. application Ser. No. 07/179,745, now U.S. Pat. No. 4,921,222, which was filed on Apr. 5, 1988.

TECHNICAL FIELD

This invention relates to articles, such as a ladles, tundishes, or the like, which are preferably employed in the manufacture of metals and their alloys, such as silicon metal, and to methods for manufacturing such articles.

BACKGROUND ART

In the metals production industry, it is often desired to transport molten metal from a primary production furnace to a secondary facility. For example, molten metal from a furnace is often transported to a casting chill, refining stand, refining furnace, continuous caster, or the like. It is known to use a ladle for this purpose.

The typical ladle is made of steel and has a heat resistant lining to withstand the high temperatures and often corrosive nature of the molten metals. The lining may be of refractory ceramic, or it may be carbonaceous, depending on the molten metal to be transported. With reference to the attached drawings, FIG. 1 is a longitudinal cross section of a prior art ladle. A steel shell 2 forms the outer part of the ladle and gives it strength. The steel shell may be reinforced in a variety of ways. Refractory linings 4 and 6 line the cavity formed by the steel shell, and molten metal 8 is poured into the cavity from a furnace, or the like. Trunnions 10 are secured to the sides of the steel shell 2 by brackets 12 for transporting the ladle, and a reinforcement plate 14, also of steel, covers the bottom for additional strength. A steel ring 16 encircles the top of the steel shell for additional strength in that region.

The ladle is carried and maneuvered to pour the metal by a machine which engages trunnions on the sides of the ladle.

As molten metal from a furnace encounters the ladle, the temperature of the ladle affects the temperature of the metal. If the ladle is too cool, some of the molten metal can freeze and adhere to the inner sides of the ladle. It is known to preheat the ladle to reduce this undesired cooling with its consequent loss of metal. Ladles are also preheated to extend the handling time of the molten metal. The handling time can be extended also by pouring the metal from the primary furnace at a higher temperature.

This required preheating of the ladle consumes energy, and the inevitable freezing of some metal produces "skulls" which must be removed mechanically. The mechanical removal of the frozen metal causes damage to the lining, necessitating costly repair.

In the production of alloys, compositions are often added to the molten metal in the ladle, and the two are mixed by bubbling reactive or non-reactive gasses through the ladle. The volume of these gases reduces the productive volume of the ladle and, accordingly, reduces the production efficiency of the operation.

It has been suggested to heat the contents of a ladle by induction heating. This technique cannot be used with most steel ladles because the carbon steel used in these ladles is also heated by the induction. Induction may be applied to ladles made of stainless steel, but the frequencies not absorbed by the stainless steel do not produce adequate heating of the contents of the ladle. These frequencies will, however, produce some stirring of the ladle's contents, which is advantageous in some situations.

Articles other than ladles are used in the metals industry for receiving molten metal. For example, a tundish is supplied with molten metal by a ladle, and the molten metal is distributed to casting devices through openings in the tundish. An article similar to a tundish is a forehearth.

SUMMARY OF THE INVENTION

In accordance with the invention, a composite article comprises glass fibers held together by an inorganic cement. In a preferred embodiment, the article is a ladle which is substantially transparent to a broad range of electromagnetic frequencies useful for inductive heating of metals and stirring of molten metals. In the preferred embodiment, a ladle in accordance with the invention comprises an outer shell of glass fibers and inorganic cement. The shell is lined with refractory materials and includes a trunnion for allowing the ladle to be moved by prior art machines.

The glass fibers and inorganic cement are transparent to electromagnetic frequencies, and the softening temperature of the glass fibers is higher than necessary for the refining of most metals (assuming the use of suitable refractory linings), including silicon. The cement may be portland cements, portland-aluminous-gypsum cements, gypsum cements, aluminous-phosphate-cements, portland-sulfoaluminate cements, calcium silicate-monosulfoaluminate cements, glass ionomer cements, or other inorganic cements. The glass fibers may be of E-glass, S-glass, alkali-resistant glass, or surface etched glasses.

The method of manufacturing articles according to the invention comprises rotating a mandrel to wind glass fibers around it. The winding technique itself is somewhat similar to a prior technique used to produce a filament-wound pressure vessel. In a known technique, glass fibers, or roving, are wound about a collapsible mandrel. The rovings are coated with an epoxy, polyester, or other organic resin. The mandrel is collapsed after winding and removed to form a pressure vessel. The vessel is very strong, but is not useful at high temperatures because of the use of heat-susceptible organic resins.

In one technique according to the invention, glass fibers are coated with an aqueous slurry of inorganic cement as they are wound about a mandrel. The fiber-cement composite thus made is allowed to air-cure.

In another technique, the cement is added to the glass fibers during winding by placing a negative electrostatic charge on the fibers and passing them through the cement which has been charged to cause it to adhere to the fibers. The cement is preferably fluidized and passed through a polarizing grid to provide the cement particles with a positive electrostatic charge. Known fluidizing techniques are useful for this purpose. A voltage differential between the fibers and the cement of about 20 kilovolts is preferred. Additional cement may be added after winding, water (preferably steam) is added in an autoclave, and the winding is heat cured.

A winding of 4000–6000 fibers is preferred. This winding may be made by drawing a plurality of fibers from a die supplied with molten glass to form a roving.

A plurality of rovings are used to provide the preferred number of fibers for the winding.

After the winding and curing have been completed, the product is completed in any desired manner. For example, if a ladle is being made, the cured winding is sawed into two parts to allow it to be removed from the mandrel. Each part is then completed by the addition of a trunnion, a suitable refractory lining, and a tail hook to form a complete ladle.

Other articles may be formed from the winding by appropriate addition of elements to the winding. For example, a tundish or forehearth may be formed by winding the fibers to form a closed, cylindrical vessel, and various openings may be made in the winding in any known manner, such as by sawing.

An object of this invention is to provide a unique article made of a composite of glass fibers and an inorganic cement.

Another object of this invention to provide a ladle which is transparent to electromagnetic energy to allow inductive heating of the contents.

Yet another object of this invention is to provide a method of making an article such as an electromagnetically transparent ladle.

DETAILED DESCRIPTION OF THE PREFERRED EMBODIMENT

Figure 1:
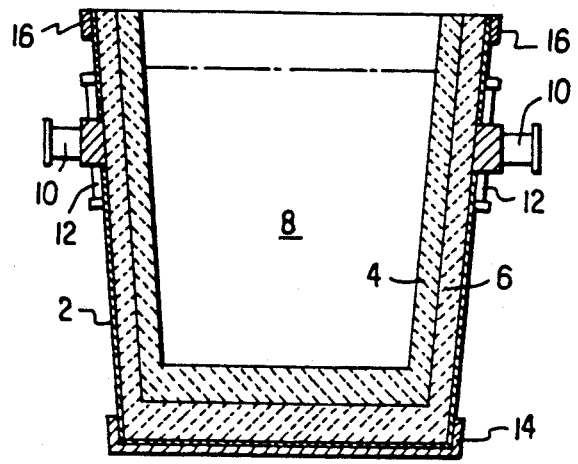
FIG. 1 is a cross section of a prior art ladle.
Figure 2:
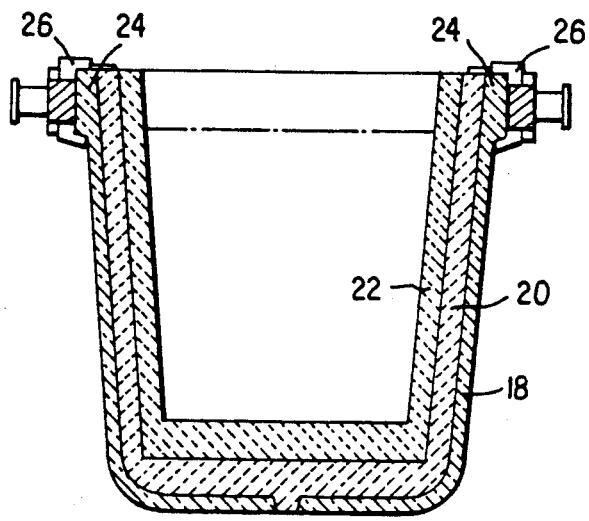
FIG. 2 is a cross section of a ladle in accordance with the invention.

FIG. 2 shows a cross section of a transparent ladle in accordance with a preferred embodiment of the invention. A glass-cement composite shell 18 forms a cavity, and the inner wall of the cavity is covered with refractory linings 20 and 22. Shell 18 has an integral ridge 24 which is engaged by a clamp 26, the clamp in turn having a bracket 28 which supports a trunnion 30. The clamp 26 is a vertically split ring comprising two halves bolted together to securely engage ridge 24. The two halves are electrically separated from each other to make the clamp less susceptible to inductive currents. The bottom of the ladle is generally flat, but a base made of similar material may be attached by cement or the like to the bottom to provide a flat surface. Further, the ladle can be made to be bottom-tapped.

Figure 3:
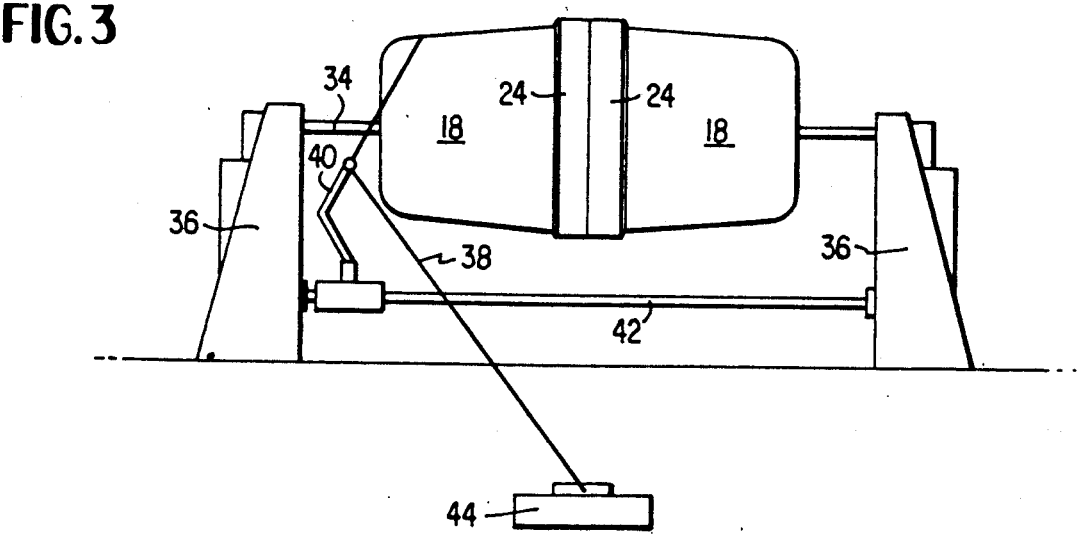
FIG. 3 is a schematic showing a preferred method of manufacturing the ladle of FIG. 2.

Shell 18 is preferably made in accordance with the technique illustrated in FIG. 3. A shaft 34 which supports a mandrel (not shown) is mounted between two supports 36 for rotation. A fiber 38, comprising a plurality of rovings, engages a guide arm 40 for moving the fiber across the mandrel as the mandrel rotates to wind the fiber. Guide arm 40 is carried by a spindle 42 which may be threaded to drive the guide arm back and forth along the length of the mandrel. The rate and direction of rotation of the shaft 34 and the motion of the guide arm are preferably electronically controlled, for example by a computer, to effect any of several desired winding patterns. Fiber 38 emerges from a source 44 which places an electrostatic charge on the fiber and on cement whereby the fiber 38 has cement attached thereto as it is wound.

The process shown in FIG. 3 winds two ladles at once, it being necessary to cut the wound product of FIG. 3 into two parts to produce two ladles of the type shown in FIG. 2.

Known winding techniques are preferably combined to produce a ladle with the required qualities. Three such techniques are, circumferential, helical, and polar, and these may be obtained with a proper combination of movements between the shaft 34 and the guide arm 40.

Other products may be made with the techniques described above. For example, a tundish or a forehearth may be made with these techniques. Further, it will be appreciated that arts not related to the metals industries may find articles made by the techniques of the invention useful because of their advantageous structural strength and electrical properties.

Modifications within the scope of the appended claims will be apparent to those of skill in the art.

I claim:

1. A method for making an inductively transparent article comprising the steps of providing a mandrel, wrapping substantially continuous inductively transparent non-metallic fiber around said mandrel, supplying an inorganic cement to said fiber to bind said fiber together to form a fiber-cement composite wall around said mandrel, and removing said composite wall from said mandrel.

2. A method according to claim 1 further comprising the step of cutting said composite wall into at least two pieces to form at least two concave articles.

3. A method according to claim 1 wherein said step of wrapping comprises the step of rotating said mandrel while supplying said fiber to said mandrel.

4. A method according to claim 1 wherein said step of supplying an inorganic cement comprises the step of applying said cement to said fiber as said fiber is wrapped around said mandrel.

5. A method according to claim 4 wherein said step of supplying comprises providing electrostatically charged cement particles, creating an electrostatic field between said fiber and said cement particles, and bringing said fiber and said cement particles close enough to each other such that said cement particles are electrostatically held to said fiber.

6. A method according to claim 1 wherein said step of supplying comprises adding said cement to said fibers after said fibers are wound around said mandrel.

7. A method according to claim 1 further comprising supplying water to said cement after said wrapping for curing said cement.

8. A method according to claim 2 wherein said step of cutting comprises the step of cutting said composite wall in a direction perpendicular to the longitudinal axis of said mandrel.

9. A method according to claim 3 wherein said step of supplying comprises the step of guiding said fiber with a guide arm to cause said fiber to move with respect to said mandrel in a prescribed pattern.

10. A method according to claim 5 further comprising the step of supplying water to said cement particles after said fiber has been wrapped around said mandrel.

11. A method according to claim 10 wherein said step of supplying water comprises supplying steam in an autoclave.

12. A method according to claim 5 wherein said step of providing electrostatically charged cement particles comprises the step of fluidizing said cement.

13. A method according to claim 1 wherein said fiber is of glass.

14. A method according to claim 13 wherein said cement is selected from the group consisting of portland cement, portland aluminous gypsum cement, gypsum cement, aluminum phosphate cement, portland sulfoaluminate cement, calcium silicate monosulfoaluminate cement, and glass ionomer cement.

15. A method according to claim 14 wherein said fiber is made of glass selected from the group consisting of E-glass, S-glass, alkali-resistant glass, and surface etched glass.

* * * * *